United States Patent [19]
Hiraoka

[11] Patent Number: 5,336,073
[45] Date of Patent: Aug. 9, 1994

[54] INJECTION PRESSURE LIMITING DEVICE FOR INJECTION MOLDING MACHINE

[75] Inventor: Kazuo Hiraoka, Chiba, Japan

[73] Assignee: Sumitomo Heavy Industries, Ltd., Japan

[21] Appl. No.: 991,257

[22] Filed: Dec. 16, 1992

[51] Int. Cl.$^5$ .............................................. B39C 45/00
[52] U.S. Cl. .................... 425/145; 264/40.5; 425/149
[58] Field of Search ............... 264/40.3, 40.5, 40.7, 264/40.1; 425/145, 147, 149

[56] References Cited

U.S. PATENT DOCUMENTS

| | | | |
|---|---|---|---|
| 3,904,078 | 9/1975 | Neff et al. | 425/145 |
| 4,120,631 | 10/1978 | Leutner et al. | 425/149 |
| 4,734,025 | 3/1988 | Kawamura et al. | 425/145 |
| 4,851,170 | 7/1989 | Shimizu et al. | 425/149 |
| 4,889,478 | 12/1989 | Sato | 425/149 |
| 4,968,462 | 11/1990 | Hara | 425/145 |
| 4,970,447 | 11/1990 | Kamiguchi et al. | 425/149 |
| 5,030,395 | 7/1991 | Kamiguchi et al. | 425/149 |
| 5,102,587 | 4/1992 | Kumamura et al. | 425/145 |
| 5,223,191 | 6/1993 | Tatsuno et al. | 425/145 |

Primary Examiner—Charles S. Bushey
Attorney, Agent, or Firm—Lorusso & Loud

[57] ABSTRACT

A pressure feedback system for limiting pressure and a minor feedback system connected to the pressure feedback system are used as a speed feedback system for controlling an injection speed. Consequently, the injection speed is controlled on the basis of an injection speed setting signal using the minor feedback system, and a filling pressure is controlled on the basis of a limit pressure setting signal using the pressure feedback system for limiting pressure. Also, a switch for selectively activating the pressure feedback system and a comparator for comparing the limit pressure setting signal with a filling pressure detection signal are provided within the pressure feedback system. The switch activates the pressure feedback system when the filling pressure detection signal is equal to or larger than the limit pressure setting signal. A normal injection speed control operation is performed until the switch activates the pressure feedback system. After the connection of the switch, a control operation in which the filling pressure is limited is performed until the dwelling process begins.

4 Claims, 4 Drawing Sheets

INJECTION PRESSURE LIMITING DEVICE FOR INJECTION MOLDING MACHINE

BACKGROUND OF THE INVENTION

The present invention relates to an injection pressure limiting device for an injection molding machine which uses a servo motor as a driving source for injection and dwell.

In conventional injection molding machines, a screw is provided in a heating cylinder in such a manner as to be rotatable and movable forward and backward. Metering is performed when the screw is rotated and moved backward by the driving source. A resin is injected and filled into the cavity of the mold when the screw is moved forward.

During the injection process in which the molten resin is filled into the cavity, the speed of the screw is detected and fed back, to control the injection speed. During the dwell phase, in which a fixed amount of pressure is applied to the resin filling the cavity, the reaction applied to a load cell is detected and fed back, to control the filling pressure.

In such an injection molding machine, when the torque generated by the driving source during filling is great, excess pressure is applied to and may break the mold. When the injection process is switched over to the dwell phase, pressure changes increase, generating an overrun of the screw. This may cause excess resin to be filled in the mold. Hence, in order to prevent excess pressure on the mold and excess filling of the resin in the mold and in order to determine when the injection process is to be switched over to the dwell phase, without utilizing a negative pressure during high-speed injection, the torque generated by the driving source during filling is limited by some means so as to limit the filling pressure to a predetermined value.

Under these circumstances, in the hydraulic type injection molding machine which employs a hydraulic circuit as the driving source, pressure generated by the hydraulic circuit is limited so as to prevent the filling pressure from exceeding the present pressure limit. In the electric injection molding machine which employs a servo motor as the driving source, the driving current supplied to the servo motor is limited by means of a servo amplifier.

Thus, the torque generated by the hydraulic circuit or the servo motor is maintained at a value not exceeding the pressure limit.

A controller of the conventional injection molding machine will be described below.

FIG. 1 is a block diagram of a controller of the conventional injection molding machine.

In the figure, an encoder 51 detects screw position. When the position signal from the encoder 51 is input to a controller 53 through an amplifier 52, a differentiator 56 differentiates the position signal and produces a screw speed detection signal d.

'c' denotes an injection speed setting signal generated during the injection process. A subtracter 57 subtracts the screw speed detection signal d from the injection speed setting signal c for the feedback operation. A compensator 58 compensates a deviation signal obtained by the subtraction and produces an operation signal g.

'a' denotes a limit pressure setting signal which is set to control the injection speed. Upon receiving the limit pressure setting signal, a limiter 61 limits the operation signal g in accordance with the magnitude of the limit pressure setting signal a, and produces an operation signal i which is sent to a servo amplifier 60. Since the operation signal i is a current instruction, i.e., a torque instruction, to the servo motor 62, the torque generated by the servo motor 62 can be limited by the limit pressure setting signal a.

However, in the thus-arranged electric or hydraulic injection molding machine, even when the operation signal g changes as the injection speed setting signal c or the screw speed detection signal d changes, the operation signal i may remain the same, provided that the operation signal g is limited by the limit pressure setting signal a.

Accordingly, in the speed feedback system in which the screw speed during injection is fed back, when the pressure of the hydraulic circuit serving as the driving source or the driving current to the servo motor is limited, the speed feedback system may not function, making the control system readily susceptible to a disturbance.

In addition, since it is the limit pressure setting signal a alone that can determine the operation signal i, an open loop control operation is conducted. That is, the sensitivity of the operation signal i to the injection speed setting signal c or the screw speed detection signal d is poor.

Furthermore, since the pressure or the driving current as the driving source is limited, it is impossible to accurately limit the actual pressure in the injection cylinder or the actual pressure in the mold. The pressure may be fed back to achieve accurate filling, but the continuity of the filling pressure is lost when the speed feedback system is switched over to the pressure feedback system, and product quality suffers.

SUMMARY OF THE INVENTION

In view of the above-described problems of the prior art, an object of the present invention is to provide an injection pressure limiting device for an injection molding machine which enables a feedback control system to function unaffected by any disturbance when the pressure of a hydraulic circuit serving as the driving source or the driving current of a servo motor serving as the driving source reaches a limit, and which assures continuity of the filling pressure when a speed feedback system is switched over to a pressure feedback system.

To achieve the above object, the injection pressure limiting device for the injection molding machine according to the present invention includes a pressure feedback system for limiting pressure, and a minor feedback system used as a speed feedback system for controlling injection speed.

Accordingly, the injection speed is controlled on the basis of an injection speed setting signal by the minor feedback system, and the filling pressure is controlled on the basis of a limit pressure setting signal by the pressure feedback system for limiting pressure.

Furthermore, a switching means for selectively activating the pressure feedback system and a means for comparing the limit pressure setting signal with the filling pressure detection signal are provided within the pressure feedback system. The switching means activates the pressure feedback system when the filling pressure detection signal is equal to or larger than the limit pressure setting signal. A normal injection speed control operation is performed until the switching means activates the pressure feedback system. After the connection by the switching means, a control operation in which the filling pressure is limited is performed until the dwell phase begins.

Therefore, continuity of the screw speed is assured, the function of the minor feedback system is not stopped, and excellent filling pressure waveforms are obtained. In addition, since the minor feedback system limits the filling pressure, an open loop operation is avoided and the system is less affected by a disturbance.

DESCRIPTION OF THE PREFERRED EMBODIMENT

An embodiment of the present invention will be described in detail with reference to the accompanying drawings.

Figure 1:
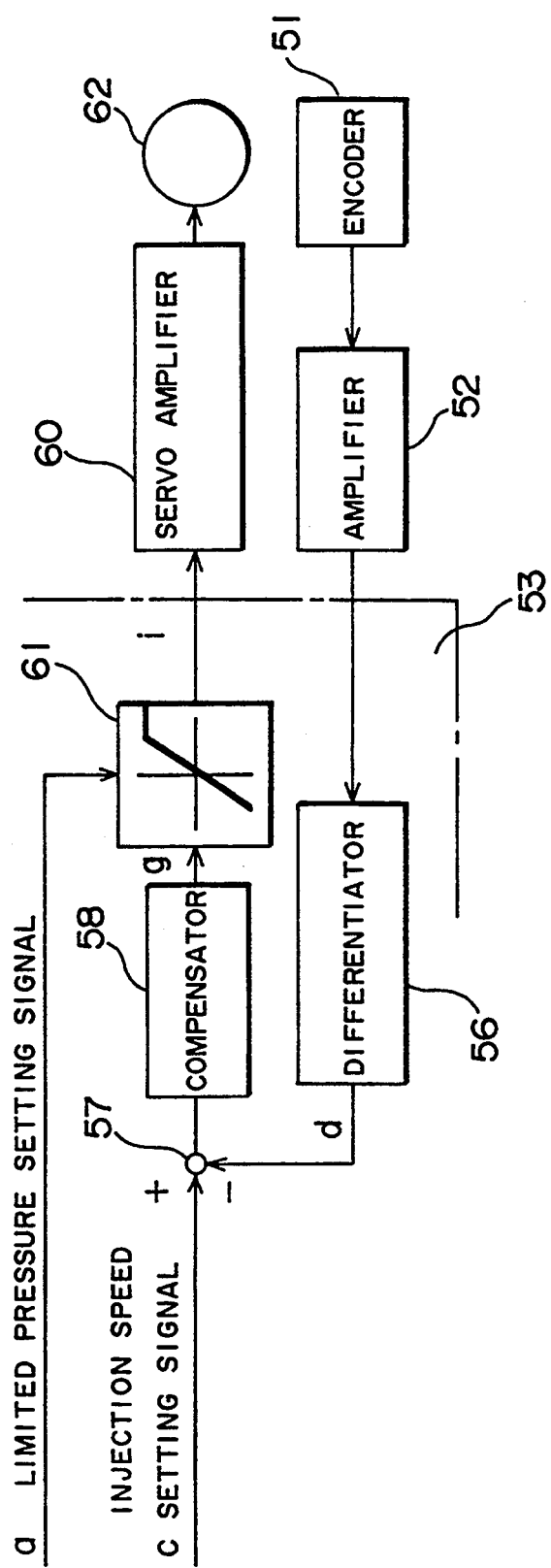
FIG. 1 is a block diagram of a controller of a conventional injection molding machine.
Figure 2:
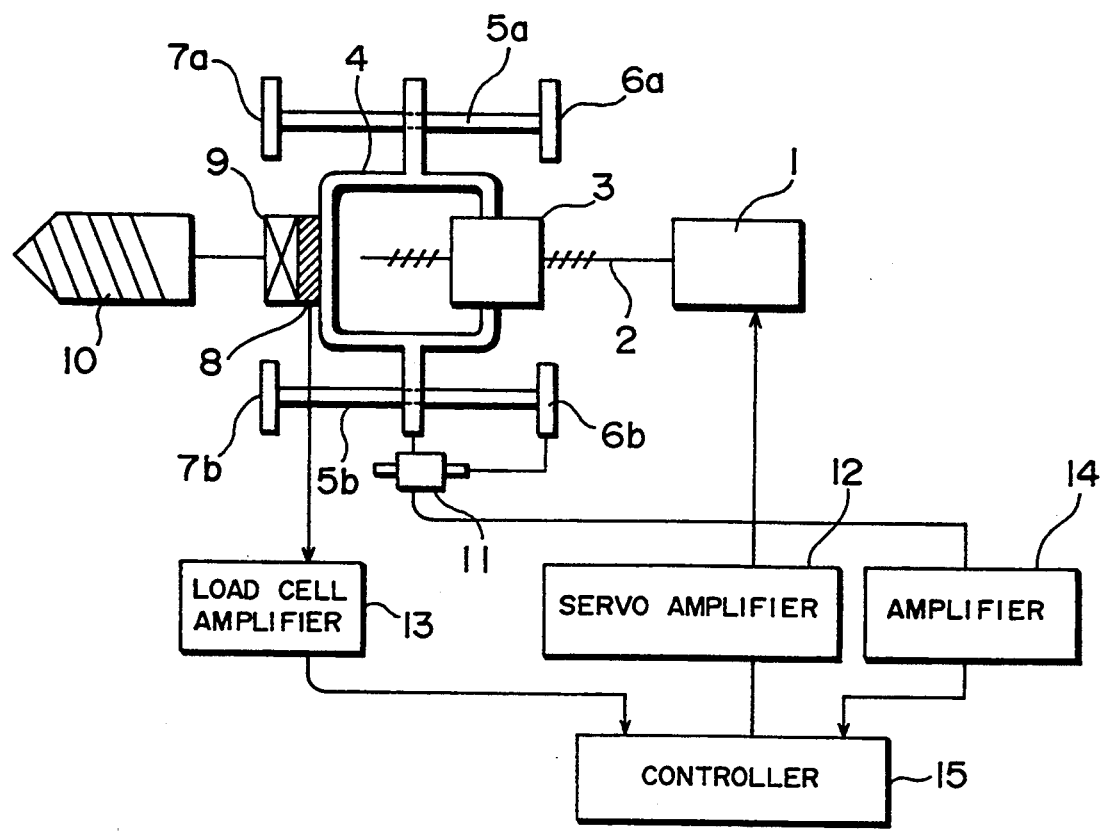
FIG. 2 is a schematic diagram of an embodiment of an injection molding machine according to the present invention.

As shown in FIG. 2, the rotation of an injection servo motor 1 is transmitted to a ball screw nut 3 through a ball screw shaft 2. The ball screw nut 3 is formed integrally with a support member 4. The support member 4 is moved back and forth along guide bars 5a and 5b extending between fixed members 6a and 7a and between fixed members 6b and 7b of an injection molding machine (not shown) in accordance with the rotation of the ball screw shaft 2, moving a screw 10 back and forth through a load cell 8 and a bearing 9.

As the screw 10 is advanced in a heating cylinder (not shown), a resin accommodated in front of the screw 10 is injected and filled into the cavity of a mold (not shown). At that time, the load cell 8 detects, as a reaction, the force which pushes the resin. The load cell amplifier 13 amplifies the detected reaction and inputs it to a controller 15.

An encoder 11 is mounted between the support member 4 and the fixed members 6b and 7b to detect movement of the screw 10, i.e., the screw position. The position signal output from the encoder 11 is amplified by an amplifier 14. The amplified signal is input to the controller 15. The controller 15 outputs various driving current instructions, set by an operator, to a servo amplifier 12 to drive the servo motor 1 for injection.

Figure 3:
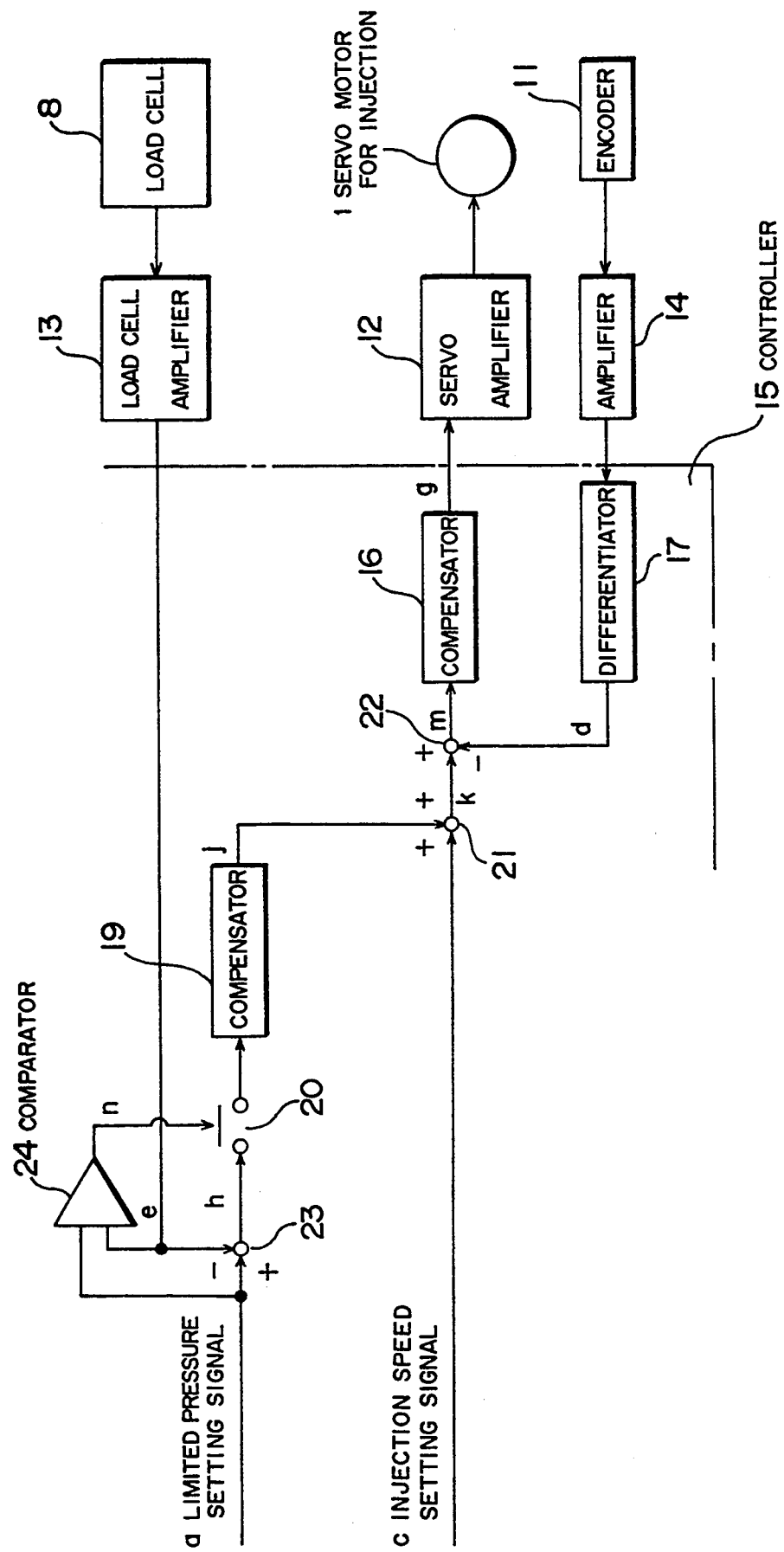
FIG. 3 is a block diagram of an injection pressure limiting device for an injection molding machine according to the present invention.

As shown in FIG. 3, when the position signal from the encoder 11 is input to the controller 15 through the amplifier 14, a differentiator 17 differentiates the position signal and produces a screw speed detection signal d.

A limit pressure setting signal a for the injection process is input to a pressure feedback system (the load cell amplifier 13 > subtracter 23 > compensator 19) for limiting pressure. A filling pressure detection signal e is input from the load cell amplifier 13 to the controller 15. A subtracter 23 subtracts the filling pressure detection signal e from the limit pressure setting signal a to perform the feedback operation, and produces a deviation signal h. The deviation signal h is compensated by a compensator 19 via a switch 20. The compensator 19 produces an operation signal j.

An adder 21 adds the operation signal j to an injection speed setting signal c during the injection process, and produces a speed instruction signal k which is input to a minor feedback system (a differentiator 17 > a subtracter 22 > a compensator 16) which is also used as a speed feedback system for controlling the injection speed.

A subtracter 22 subtracts the screw speed detection signal d from the speed instruction signal k, and thereby produces a deviation signal m. A compensator 16 compensates the deviation signal m and sends the compensated signal to the servo amplifier 12 as an operation signal g.

A comparator 24 receives the limit pressure setting signal a and the filling pressure detection signal e, and sends an output signal n to the switch 20 to turn on and off the switch 20 and thereby selectively sends the deviation signal h to the compensator 19.

Figure 4:
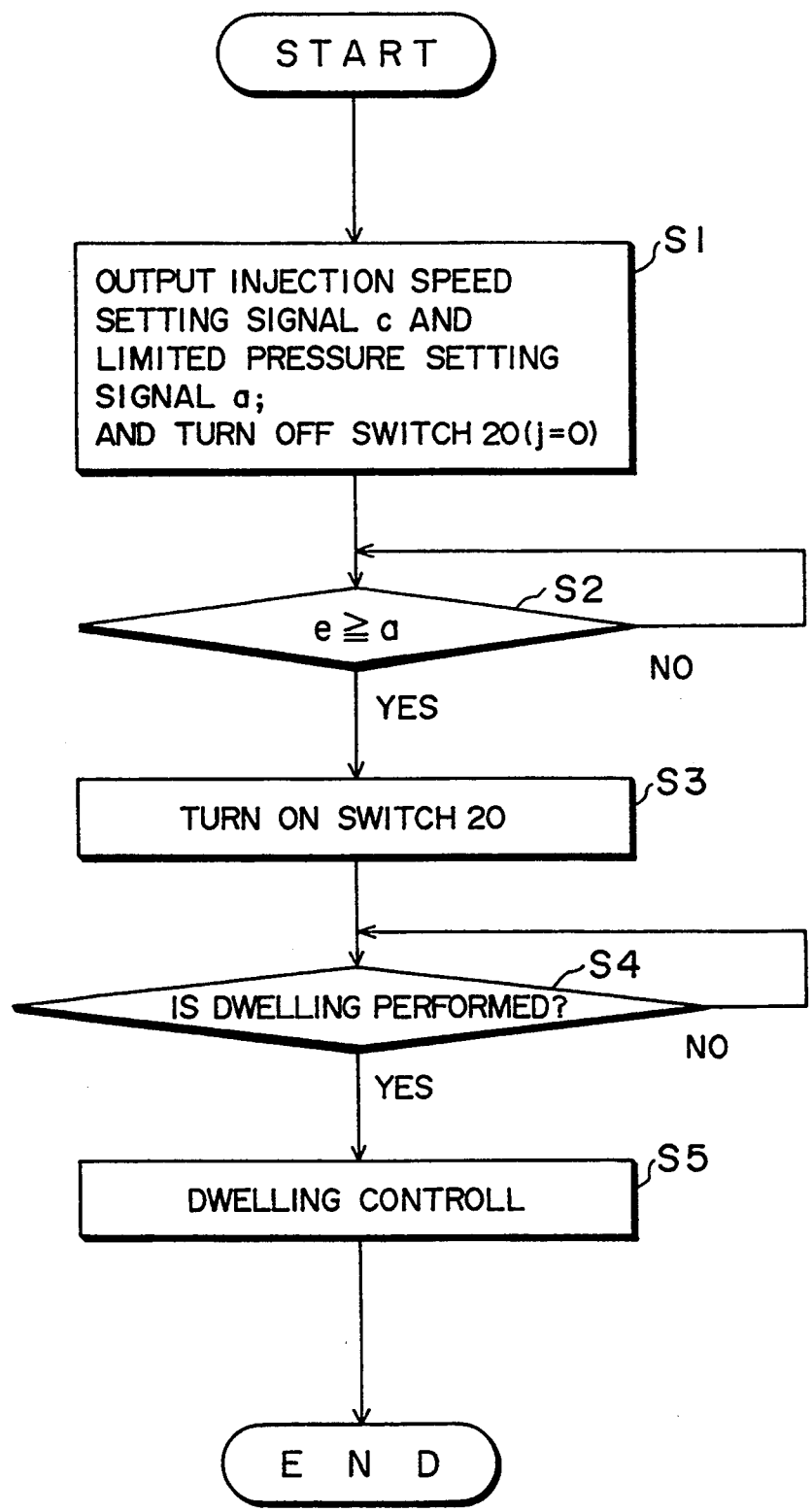
FIG. 4 is a flowchart showing the operation of the injection pressure limiting device of FIG. 3.

FIG. 4 is a flowchart showing the operation of the injection pressure limiting device for the electric injection molding machine according to the present invention.

Step S1, S2: When the injection process starts, the limit pressure setting signal a and the injection speed setting signal c are output. At that time, the switch 20 (FIG. 3) is turned off to cut off the operation signal j from the compensator 19. Normal injection speed control is performed until the filling pressure detection signal e reaches the value of limit pressure signal a.

Step S3: When the filling pressure detection signal e reaches the value of the limit pressure signal a, the switch 20 is turned on by the output signal n, whereby control in which the filling pressure is limited is performed.

Step S4, S5: Control in which the filling pressure is limited is performed until the previously set switching conditions for the dwelling process are established, the conditions including the screw position and the time elapsed after the injection process starts. When those switching conditions are established, dwelling control starts.

In addition, control in which the filling pressure is limited is performed by adding the operation signal j in the pressure feedback system to the injection speed setting signal c. The transfer function in the compensator 19 is expressed by the following equation:

$$j/h = 1/Ts \qquad (1)$$

$s$: Laplace operator $T$: Integration constant

Since equation (1) expresses the transfer function of the integrator, the compensator 19 integrates the deviation signal h, and produces the operation signal j.

The speed instruction signal k, which is input to the minor feedback system, is expressed by:

$$k = j + c \qquad (2)$$

Thus, from equations (1) and (2), we have $$k = c + h/Ts \qquad (3)$$

The integrated value, i.e., the operation signal j, is zero until switch 20 is turned on. The deviation signal h is given by:

$$h = a - e \qquad (4)$$

The moment switch 20 is turned on, the filling pressure detection signal e is given by:

$$e = a$$

Therefore, the deviation signal h is O.

Furthermore, when switch 20 is turned on, the operation signal j is O.

Therefore, the speed instruction signal k is expressed by $$k = c$$

and, the continuity of the screw speed is thus maintained.

Thereafter, as the screw 10 (FIG. 2) is accelerated and the filling pressure detection signal e thus increases to a value larger than the limit pressure setting signal a, a negative deviation signal h is increased. The increased negative deviation signal h is integrated by the compensator 19, and the speed instruction signal k decreases to a value smaller than the injection speed setting signal c which is an initial value obtained by equation (3), decelerating the screw 10. As the screw 10 is decelerated and the filling pressure detection signal e thus decreases to a value smaller than the limit pressure setting signal a, a positive deviation signal h is increased.

The increased positive deviation signal h is similarly integrated by the compensator 19, and the speed instruction signal k thus increases to a value larger than the injection speed setting signal c which is the initial value obtained by equation (3) to accelerate the screw 10.

Thus, after switch 20 is turned on, the filling pressure is controlled to the value of the limit pressure setting signal a by means of a combination of the injection speed setting signal c and the pressure feedback system until the dwelling process starts.

It is to be understood that the present invention is not limited to the above described embodiment but, rather, may vary broadly consistent with its spirit and scope as set out in the accompanying claims. For example, although an electric injection molding machine has been described in the above-described embodiment, the present invention can also be applied to a hydraulic injection molding machine.

What we claim is:

1. An injection molding machine comprising:
   (a) a screw mounted within a heating cylinder for rotation and for reciprocating with back and forth linear motion;
   (b) driving means for moving said screw forward to fill a resin into a cavity of a mold;
   (c) means for detecting filling pressure with which the resin is filled into the mold and for generating a filling pressure detection signal;
   (d) means for detecting screw speed and for generating a screw speed detection signal; and
   (e) a controller including:
   (i) speed feedback means, for controlling injection speed;
   (ii) a pressure feedback circuit, connected to said speed feedback means, for limiting the filling pressure in accordance with a pressure limit setting signal, said pressure feedback circuit comprising:
   (1) switching means, disposed within said pressure feedback circuit, for selectively starting pressure feedback control; and
   (2) comparing means for comparing the pressure limit setting signal with the filling pressure detection signal and for generating a switch signal for operation of said switching means to start pressure feedback control when the filling pressure detection signal is equal to or larger than the pressure limit setting signal.

2. An injection pressure limiting device for an injection molding machine according to claim 1, wherein said pressure feedback circuit further comprises:
   injection speed setting means for inputting an injection speed setting signal to said controller;
   first subtraction means for subtracting the filling pressure detection signal from the pressure limit setting signal to obtain a deviation signal;
   compensating means for compensating said deviation signal to obtain an operation signal; and
   wherein said speed feedback means comprises:
   second subtraction means for subtracting the screw speed detection signal from a speed instruction signal and adding means for adding said operation signal and said injection speed setting signal to obtain said speed instruction signal.

3. An injection pressure limiting device for an injection molding machine according to claim 1, wherein said switching means is an on-off switch which is turned on and off by said switch signal from said comparing means.

4. An injection pressure limiting device for an injection molding machine according to claim 2, wherein said switching means is an on-off switch which is turned on and off by said switch signal from said comparing means.

* * * * *